United States Patent
Wang et al.

(10) Patent No.: US 12,153,168 B2
(45) Date of Patent: Nov. 26, 2024

(54) COMPENSATION OF BEAM DEVIATION IN LIGHT DETECTION AND RANGING (LIDAR)

(71) Applicant: BEIJING VOYAGER TECHNOLOGY CO., LTD., Beijing (CN)

(72) Inventors: Chao Wang, Mountain View, CA (US); Wenbin Zhu, Mountain View, CA (US); Yonghong Guo, Mountain View, CA (US); Lingkai Kong, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1053 days.

(21) Appl. No.: 17/092,992

(22) Filed: Nov. 9, 2020

(65) Prior Publication Data

US 2022/0146630 A1    May 12, 2022

(51) Int. Cl.
*G01S 7/487* (2006.01)
*G01S 7/497* (2006.01)
*G01S 17/931* (2020.01)

(52) U.S. Cl.
CPC .............. *G01S 7/487* (2013.01); *G01S 7/497* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 2020/0225328 A1* | 7/2020 | Mohr | G02B 5/045 |
| 2021/0278741 A1* | 9/2021 | Ziemkiewicz | G01S 7/4812 |
| 2022/0026576 A1* | 1/2022 | Baribault | G01S 17/86 |
| 2022/0075044 A1* | 3/2022 | Michaels | G01S 7/4812 |
| 2023/0185118 A1* | 6/2023 | Nomura | G02F 1/0115 |
| | | | 359/247 |

\* cited by examiner

*Primary Examiner* — Isam A Alsomiri
*Assistant Examiner* — Sanjida Naser
(74) *Attorney, Agent, or Firm* — BAYES PLLC

(57) ABSTRACT

Embodiments of the disclosure provide a light detection and ranging (LiDAR) system. In an example, the LiDAR system includes a laser source, a scanner, a beam deflecting unit, and a controller. The laser source is configured to emit a laser beam towards an object. The scanner is configured to receive a returned laser beam from the object, and deflect the returned laser beam towards a beam deflecting unit to form a first laser beam traveling along a first direction. The first direction deviates from a reference direction by a deviation angle. The beam deflecting unit is configured to receive the first laser beam, and deflect the first laser beam to form a second laser beam towards a photosensor. The controller is configured to dynamically control a deflection angle of the beam deflecting unit to cause the second laser beam to be deflected towards the photosensor to compensate the deviation angle.

20 Claims, 7 Drawing Sheets

COMPENSATION OF BEAM DEVIATION IN LIGHT DETECTION AND RANGING (LIDAR)

TECHNICAL FIELD

The present disclosure relates to a Light Detection and Ranging (LiDAR) system, and more particularly to compensation of beam deviation in a LiDAR system.

BACKGROUND

LiDAR systems have been widely used in autonomous driving and producing high-definition maps. For example, LiDAR systems remeasure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

A LiDAR system typically includes a transmitter to emit a laser pulse to an object. The laser pulse is backscattered and returned by the object, and the returned laser pulse is received by a LiDAR receiver. The laser pulse is often deflected, by a scanner, towards an optical detector so that the laser pulse can be received and converted into an electrical signal. The distance to the object (also referred to as the "range") can be estimated based on a traveling time of the laser pulse and the speed of light.

The pulsed laser light beams emitted by a LiDAR system are typically directed to multiple directions to cover a field of view (FOV). To perform the scanner, the scanner continuously rotates at a fixed or varying angular velocity. Because of this angular movement, the scanner is at a different rotation angle when the emitted laser pulse is reflected by the scanner towards the object compared to that when the laser pulse returned from the object is reflected by the scanner towards the optical detector. As a result, the returned laser pulse is often deflected by the scanner to deviate from its reference travelling direction and therefore impinges at a different location from the expected location on the optical detector. This phenomenon is known as "beam walking." Because the amount of angle the beam walks (i.e. the beam deviation) is determined by the distance between the LiDAR and the object, which is unknown, it is difficult to predict where on the optical detector will receive the returned laser beam. Not only full-coaxial LiDARs, where the transmitting and receiving systems share the same scanner, suffer from the beam walking issue, non-coaxial LiDARs using separate scanners for transmitting and receiving systems may also face the same issue.

To account for the effect of beam walking, some existing range estimation methods use an optical detector with a relatively large (e.g., an increased) area. However, increasing the area of the optical detector may introduce substantial noises, resulted from the scattering of undesirable light such as sunlight, during operation of the LiDAR system.

Embodiments of the disclosure address the above problems by an improved receiver having a beam deflecting unit for compensating any beam deviation in LiDAR.

SUMMARY

Embodiments of the disclosure provide a LiDAR system, which includes a laser source, a scanner, a beam deflecting unit, and a controller. The laser source is configured to emit a laser beam towards an object. The scanner is configured to receive a returned laser beam from the object, and deflect the returned laser beam towards a beam deflecting unit to form a first laser beam traveling along a first direction. The first direction deviates from a reference direction by a deviation angle. The beam deflecting unit is configured to receive the first laser beam, and deflect the first laser beam to form a second laser beam towards a photosensor. The controller is configured to dynamically control a deflection angle of the beam deflecting unit to cause the second laser beam to be deflected towards the photosensor to compensate the deviation angle.

Embodiments of the disclosure also provide a method for compensating beam deviation in a LiDAR system. The method includes receiving, by a scanner, a returned laser beam from an object, and deflecting, by the scanner, the returned laser beam towards a beam deflecting unit to form a first laser beam traveling along a first direction. The first direction deviates from a reference direction by a deviation angle. The method also includes deflecting, by the beam deflecting unit, the first laser beam to form a second laser beam towards a photosensor. The method further includes dynamically controlling, by a controller, a deflection angle of the beam deflecting unit to cause the second laser beam to be deflected towards the photosensor to compensate the deviation angle.

Embodiments of the disclosure also provide a system for compensating beam deviation in LiDAR. The system includes a beam deflecting unit and a controller. The beam deflecting unit is configured to receive a first laser beam traveling along a first direction. The first laser beam is formed by a scanner by deflecting a laser beam emitted by a laser source towards an object and then returned from the object. The first direction deviates from a reference direction by a deviation angle. The beam deflecting unit deflects the first laser beam to form a second laser beam towards a photosensor. The controller configured to dynamically control a deflection angle of the beam deflecting unit to cause the second laser beam to be deflected towards the photosensor to compensate the deviation angle.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The present disclosure is made in a three-dimensional coordinate system, with x-axis, y-axis, and z-axis representing the three dimensions. In some embodiments of the present disclosure, the "fast axis" is parallel to the z-axis, the "slow axis" is parallel to the y-axis, and the "optical axis" is parallel to the x-axis. The z-axis (e.g., the vertical axis/direction) can be perpendicular to the x-y plane (e.g., the horizontal/lateral plane), and the x-axis and the y-axis can be perpendicular to each other. The x-axis/direction and the y-axis/direction can each be referred to as a lateral direction.

In the present disclosure, the "incident direction" of a light beam refers to the direction defined by the incident angle between the light beam and the surface normal of the object the light beam is incident on. In the present disclosure, the "exiting direction" of a light beam refers to the direction defined by the exiting angle between the light beam and the surface normal of the object the light beam is exiting.

In the present disclosure, an "incident surface" refers to the surface on which a light beam is incident, and an "exiting surface" refers to the surface from which a light beam is exiting. In some applications, incident and exiting surfaces of an object (e.g., an EO crystal) are located at the opposing sides of the object.

In the present disclosure, a "top end" refers to a portion of an object (e.g., an EO crystal) that has a higher elevation along the z-axis, and a "bottom end" refers to a portion of the object that has a lower elevation along the z-axis.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

Figure 1:
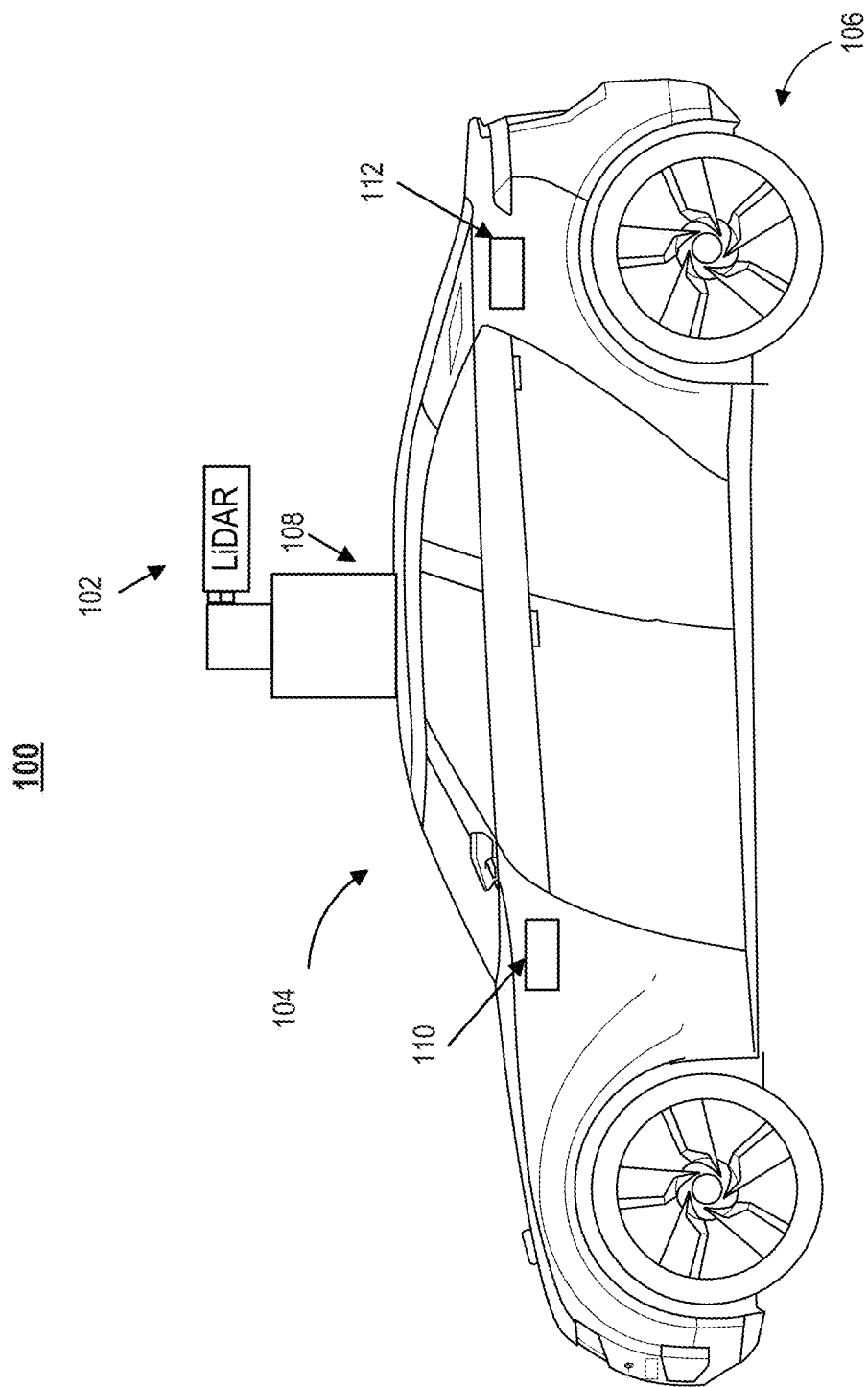
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

In many LiDAR systems, light steering in LiDAR system 102 typically involves the projection of light in a predetermined direction to facilitate, for example, the detection and ranging of an object, the illumination and scanning of an object, or the like. Light steering can be performed in both transmission and reception of light (e.g., a laser pulse). For example, a LiDAR system can include a transmitter that has a scanner to control the projection direction of the laser pulse to detect/image an object. Moreover, a LiDAR system can include a receiver that includes a scanner to control a direction of laser pulse for it to be detected by the photo-detector without being interfered with other unwanted signals. In a full-coaxial system, the same scanner is used for both transmission and reception of the laser pulse, whereas in a non-coaxial system, the receiver employs a separate (or only) scanner.

As mentioned earlier, using conventional range estimation methods, the amount of beam deviation of the returned laser pulse from its reference traveling direction is hard to predict due to the unknown distance between an object and the LiDAR system. For example, in a full-coaxial LiDAR system, traveling direction along which the laser pulse is incident on the scanner can be used as the reference traveling direction for the returned laser pulse to travel from the scanner to photosensor. It is contemplated that the reference traveling direction can be defined as any other suitable direction as long as it is known and fixed. The returned laser beam, if travels along the reference traveling direction, can be incident on a predetermined area of the photodetector. The predetermined area on the photodetector is designed to receive a maximum portion of the returned laser pulse and a minimal amount of unwanted light signals, thus reducing noise signals such as sunlight in the detection. Because of the unknown distance between the object and the LiDAR system, the arrival time of the returned laser pulse becomes unpredictable. As a result, it is difficult to predict and control the rotation angle of the scanner to adjust the traveling direction of the returned laser beam and divert it towards the predetermined area, when the returned laser beam arrives at the scanner.

Similarly, in a LiDAR system with a non-coaxial system for light steering, although the scanner that receives and deflects the returned laser pulse is not used in the transmission of the laser pulse, the arrival time of the returned laser pulse is still unknown. As a result, when the returned laser pulse arrives at the scanner, the scanner may have rotated an angle such that the returned laser pulse is reflected in a direction deviating from the reference traveling direction. As a result, the returned laser pulse would not be incident on the predetermined area of the photodetector.

To alleviate the beam walking problem, an existing LiDAR system typically employs an optical detector with a relatively large (e.g., an increased) area to account for this unknown deviation of the returned laser pulse. However, increasing the area of the optical detector may introduce substantial noises, resulted from the scattering of undesirable light such as sunlight, during operation of the LiDAR system.

The present disclosure provides method and systems to dynamically compensate the deviation angle of the returned laser beam regardless how far the object is. The compensation mechanism employs a beam deflecting unit placed between the scanner and the photodetector. The beam deflecting unit may be synchronized with the scanner (and sometimes the laser source) such that the beam deflecting unit continuously provide a respective deflection angle at each time point until the returned laser pulse is detected by the photodetector. The value of each deflection angle is configured to compensate the deviation angle of the returned laser beam if the returned laser beam arrives at the scanner at the respective time point. By deflecting the returned laser pulse by the respective deflection angle at each time point, the beam deflecting unit compensates the deviation angle caused by beam walking and restores the direction of the returned laser pulse to the reference direction. As a result, the returned laser pulse can impinge on a predetermined area on the photodetector. By synchronizing the deflection angle of the beam deflecting unit with the rotation of the scanner, the deviation angle is always compensated notwithstanding the unpredictability of the arrival time of the returned laser pulse, and can thus be more accurate and robust.

In some embodiments, the compensation mechanism employs a controller to control the synchronization between the beam deflecting unit and the scanner, and control the beam deflecting unit to generate a respective deflection angle at each time point after the emission of the laser pulse. In some embodiments, the deflection angle is controlled to be equal to twice a respective angle change of the scanner at each time point, where the angle change is the difference in rotation angles of the scanner between the time of emission and the current time point. The controller can send a control signal, indicative of the angle change, to the beam deflecting unit, which may respond to the control signal by varying the deflection angle accordingly and timely. Because the rotation angles of the scanner at the time of emission and the current time point can each be measured and/or predetermined, and are not dependent on the arrival time of the returned lase pulse, the determination of the deflection angle thus does not require the knowledge of the actual arrival time of the returned laser pulse. The compensation of deviation angle is thus more effective and more accurate.

Figure 2A:
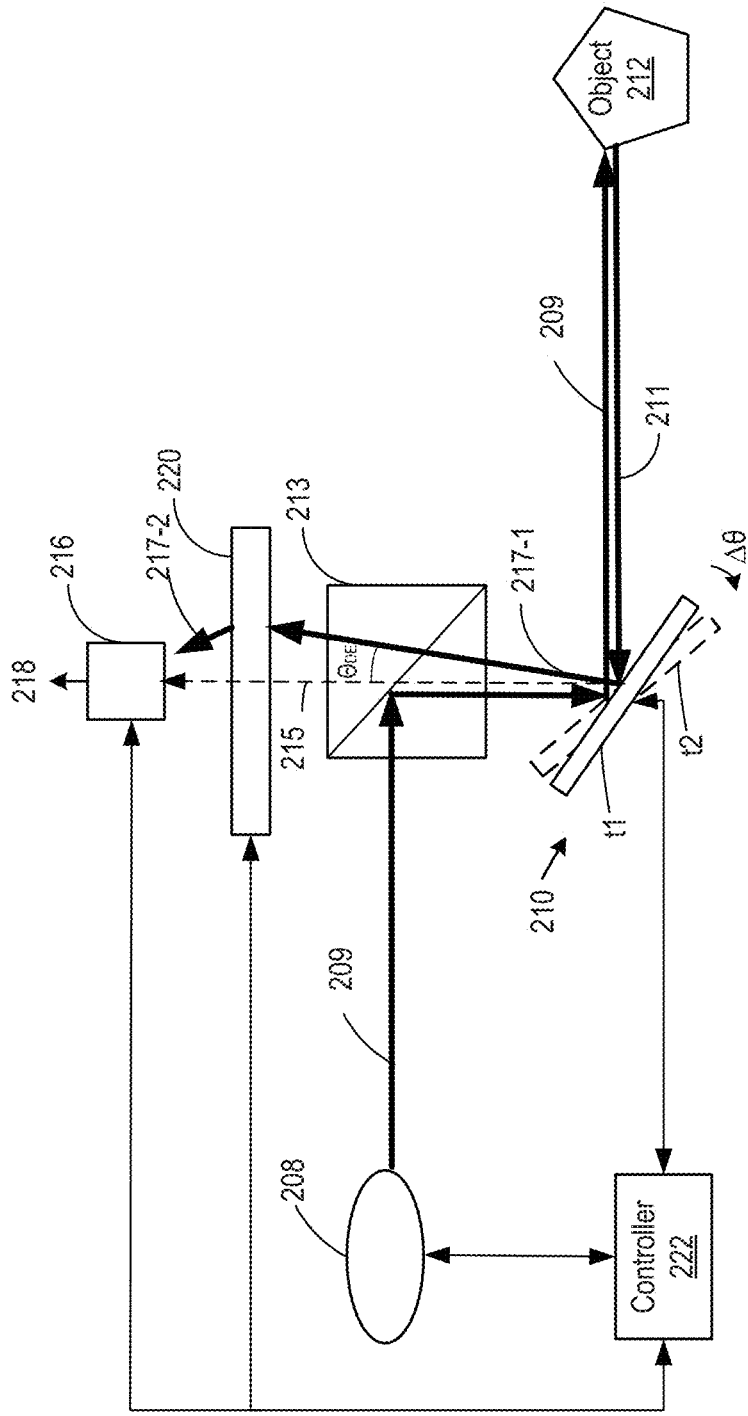
FIG. 2A illustrates a full-coaxial system having an exemplary beam deflecting unit for compensating beam deviation, according to embodiments of the disclosure.
Figure 2B:
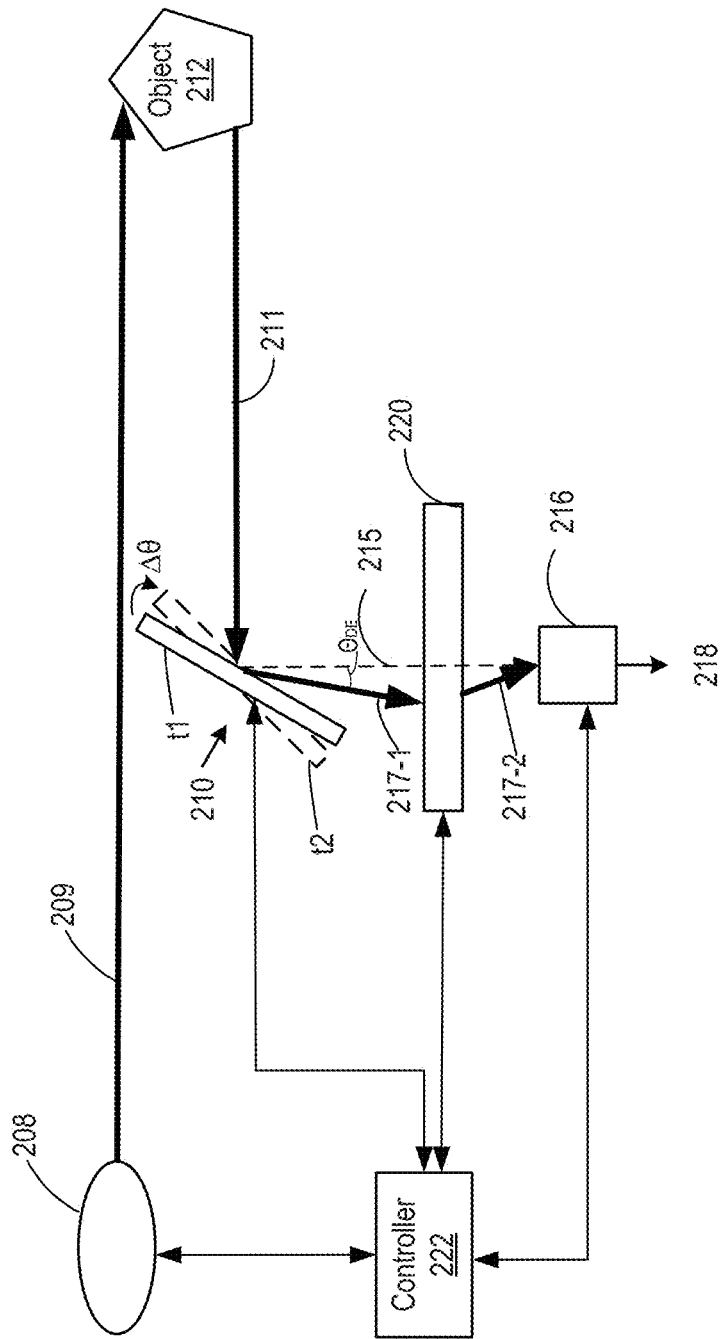
FIG. 2B illustrates a non-coaxial system having an exemplary beam deflecting unit for compensating beam deviation, according to embodiments of the disclosure.
Figure 3A:
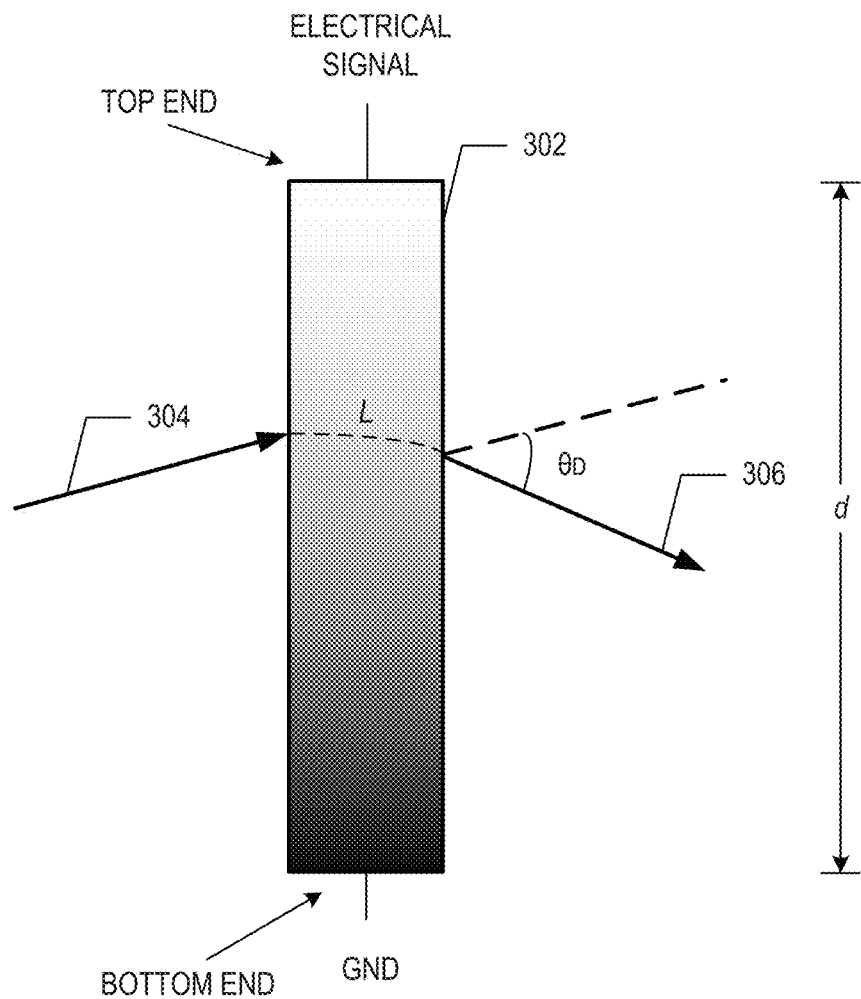
FIG. 3A illustrates a schematic diagram of an exemplary electro-optical (EO) beam deflecting unit, according to embodiments of the disclosure.
Figure 3B:
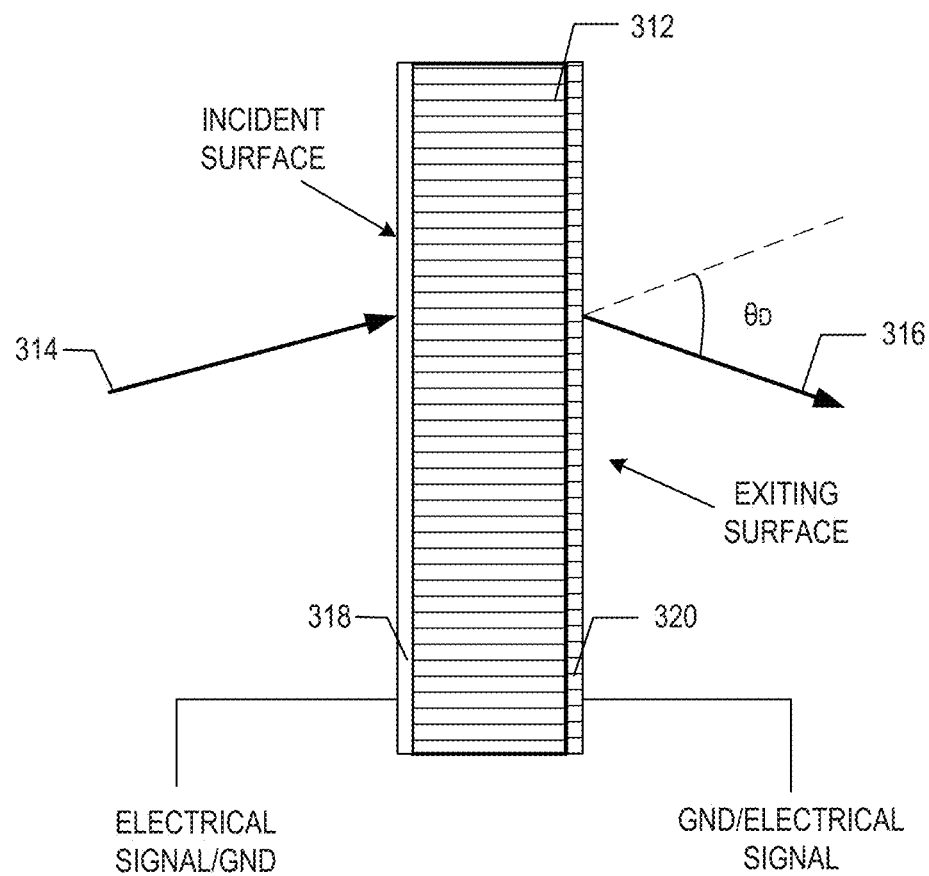
FIG. 3B illustrates a schematic diagram of another exemplary EO beam deflecting unit, according to embodiments of the disclosure.

In some embodiments, the beam deflecting unit includes an EO beam deflecting unit. FIGS. 2A and 2B each illustrates an example of internal components of a LiDAR system 102, according to some embodiments. Specifically, FIG. 2A illustrates the configuration of a full-coaxial system 200, and FIG. 2B illustrates the configuration of a non-coaxial system 201. Each of full-coaxial system 200 and non-coaxial system 201 includes a transmitter, a receiver, a scanner, and a controller coupled to the transmitter, the receiver, and the scanner. Full-coaxial system 200 and non-coaxial system 201 each includes a beam deflecting unit 220 as part of the receiver. The controller may respectively control various operations of full-coaxial system 200 and non-coaxial system 201. FIGS. 3A and 3B each illustrates an exemplary EO beam deflector, according to some embodiments. For ease of illustration, FIGS. 2A, 2B, 3A, and 3B are described together.

As shown in FIG. 2A, full-coaxial system 200 includes a laser source 208, a splitter 213, a scanner 210, a beam deflecting unit 220, a photosensor 216, and a controller 222. Controller 222 may control the operations of full-coaxial system 200 to range the surroundings and detect any object 212. Laser source 208 may be part of the transmitter of LiDAR system 102. Beam deflecting unit 220 and photosensor 216 may be part of the receiver of LiDAR system 102. For ease of description, a laser beam 209 includes a single laser pulse.

Laser source 208 may be configured to provide a laser beam 209 in a respective incident direction to light splitter 213. Laser beam 209 may be deflected several times before being scanned towards an object 212. In some embodiments of the present disclosure, laser source 208 may generate one or more pulsed laser beams in the ultraviolet, visible, or near infrared wavelength range. Laser source 208 can include any suitable laser emitting device(s) such as one or more pulsed laser diode (PLD). Depending on the light-emitting materials (e.g., semiconductor materials) in the laser emitting devices, the wavelength of native laser beam 209 provided by a PLD may be any suitable value(s) that can be detected by photosensor 216. For example, the wavelength of laser beam: 209 may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm.

Beam splitter 213 may be an optical ice that can split an incident light beam into two or more light beams. For full-coaxial system 200, beam splitter 213 may be configured to reflect laser beam 209 to scanner 210. In some embodiments, splitter 213 may also divert a returned laser beam 211 to photosensor 216. Beam splitter 213 may include transparent materials such as glass prisms that are glued together to deflect light beams in different directions. Beam splitter 213 may be a polarizing device or a non-polarizing device.

Scanner 210 may scan laser beam 209 in the three-dimensional (3D) space at a desired scanning rate within a scanning angle. Scanner 210 may be made of or coated with a reflective material. It can rotate to various rotation angles for deflecting/reflecting an incident laser beam, e.g., from laser source 208 and object 212. For example, on the transmission side, scanner 210 may be configured to receive and emit laser beam 209 towards an object 212 in a scanning direction. When laser beam 209 arrives at scanner 210 from beam splitter 213, scanner 210 may be rotated to a first rotation angle, and deflect laser beam 209 towards object 212. at the first rotation angle. At each time point during the scan, scanner 210 may emit laser beam 209 to object 212 in a respective scanning direction within the scanning angle. Scanner 210 may also include optical components (e.g., lenses, mirrors) that can focus pulsed laser light into a narrow laser beam to increase the scan resolution and range of object 212. Object 212 may be made of a wide range of materials including, for example, non-metallic objects, rocks, rain, chemical compounds, aerosols, clouds and even single molecules.

In full-coaxial system 200, scanner 210 may also be part of the receiver and configured to receive and deflect returned laser beam 211, formed from the reflection of laser beam 209 by object 212. Laser beam 209 can be reflected by object 212 via backscattering, such as Rayleigh scattering, Mie scattering, Raman scattering, and fluorescence, forming returned laser beam 211 towards scanner 210. Returned laser beam 211 may have the same wavelength as laser beam 209. In some embodiments, after steering laser beam 209 towards object 212, scanner 210 continues to rotate, and may rotate to a second rotation angle at the time returned laser beam 211 arrives at scanner 210 from object 212. Scanner 210 may divert returned laser beam 211 to beam deflecting unit 213 via beam splitter 213, to form a first laser beam 217-1.

First laser beam 217-1, formed by the deflection of returned laser beam 211 by scanner 210, may travel in a direction that deviates from a reference direction. The reference direction may represent a direction (e.g., a reference direction) along which a laser beam would travel from scanner 210, via beam splitter 213, to a predetermined area in photosensor 216. A difference between the direction of first laser beam 217-1 and the reference direction may be referred to as a deviation angle. For ease of description, the laser beam is referred to as a reference laser beam, which is an imaginary beam that travels along the reference direction from scanner 210 to photosensor 216. For full-coaxial system 200, in some embodiments, the reference direction represents the direction along which returned laser beam 211 would be deflected by scanner 210 if the rotation angles of scanner 210 at the time of emission and at time of arrival are the same. Because the distance from laser source 208 to scanner 210 is sufficiently small compared to the speed of light, the rotation angle of scanner 210 may be considered unchanged from the time of emission to the time when laser beam 209 arrives at scanner 210. In other words, if an angle change between the rotation angles of scanner 210 at the time of emission and at time of arrival is zero, first laser beam 217-1 would have traveled along the reference direction towards the predetermined area.

As shown in FIG. 2A, a dashed arrow is depicted to represent reference laser beam 215, which travels along the reference direction towards the predetermined area on photosensor 216. In some embodiments, the reference direction is the exact opposite direction of the direction along which laser beam 209 travels from beam splitter 213 to scanner 210. The deviation angle, represented by $\theta_{DE}$, may be the difference between directions of reference laser beam 215 and first laser beam 217-1. Assuming the time of emission of laser beam 209 is t1 and the time of arrival of returned laser beam 211 (e.g., at scanner 210) is t2, angle change $\Delta\theta$ may be equal to the difference between the rotation angles of scanner 210 at t1 and t2, respectively. Based on the geometric relationship between the rotation angle of scanner 210 and the direction of first laser beam 217-1, angle change $\Delta\theta$ is proportional to the deviation angle at the same time point, which is equal to twice the angle change, i.e., $(2\times\Delta\theta)$.

Beam deflecting unit 220 may be configured to deflect an incident laser beam, reflected by scanner 210, towards a predetermined area towards photosensor 216. Beam deflecting unit 220 may provide a deflection angle that can be adjusted at each time point to compensate the deviation angle at the current time point. In some embodiments, controller 222 controls beam deflecting unit 220 to vary the deflection angle at each time point. Because of the unknown distance between object 212 and scanner 210 (e.g., LiDAR system 102), the exact rotation angle of scanner 210 at the time of arrival of returned laser beam 211 can be difficult to predict and thus, the exact deviation angle of first laser beam 217-1 is difficult to determine. However, the deviation angle is always proportional to the angle change, and the angle change at any given time point can be calculated based on the scanner's angular velocity. Accordingly, by synchronizing the deflection angle with the angle change of scanner 210, beam deflection unit 220 can compensate the deviation at any given time.

Beam deflecting unit 220 may include any suitable light-deflecting devices that can be controlled to deflect an incident laser beam timely based on a control signal. In some embodiments, the magnitude of the control signal is proportional to $\Delta\theta$ (i.e., the deviation angle) of the same time point. In some embodiments of the present disclosure, Beam deflecting unit 220 may include an EO beam deflector and/or an acousto-optical (AO) beam deflector. An EO beam deflector includes an EO material of which the refractive index can be modulated as a function of the voltage potential applied on the EO material. In some embodiments, the voltage potential can be applied to beam deflecting unit 220 by controller 222 through a control signal. An AO beam deflector includes an AO material of which the refractive index can be timely modulated as a function of the acoustic signal applied to on the AO material. In some embodiments, the acoustic signal can be applied to beam deflecting unit 220 by controller 222 through a control signal. Thus, the deflection angle of beam deflecting unit 220, by using the EO and/or AO deflectors, may be adjusted by controller 222. For ease of illustration, beam deflecting unit 220 is described to include one EO deflector and the deflection angle of beam deflecting unit 220 is equal to the deflection angle of the single EO deflector. It is noted that, in various designs, beam deflecting unit 220 can include more than one EO deflectors to reach a desired deflection angle, which can be a combination of respective deflection angles of multiple EO deflectors. In various embodiments, the position and orientation of beam deflecting unit 220 are optimized so that a maximum portion of light beam can be received and deflected along the reference direction. FIGS. 3A and 3B each illustrates working mechanisms of an exemplary EO deflector.

FIG. 3A illustrates an EO deflector 302 in beam deflecting unit 220. EO deflector 302 deflects a laser beam based on a refractive index gradient on which the laser beam impinges. An input laser beam 304 may be received by EO deflector 302 on one side (e.g., on an incident surface). Input laser beam 304 may be deflected by EO deflector 302 and exit from the other side (e.g., from an exiting surface), forming an output laser beam 306. Input laser beam 304 may impinge on EO deflector 302 from any suitable direction. As an example, the incident angle of input laser beam 304 is a right angle. A deflection angle, e.g., a difference between directions of input and output laser beams 304 and 306, is represented by $\theta_D$. EO deflector 302 may include a non-uniform medium formed by an EO material body. The EO material body may be made of any suitable EO crystals of which the refractive indices can be modulated by an electric field formed by a voltage potential applied on the EO material body. In various embodiments, EO deflector 302 may include ZnSe, ZnTe, KDP, LiNbO$_3$, BaTiO$_3$, LiTaO$_3$, KTiOPO$_4$, LN, ADP, SrTiO$_3$, PLZT, KTN, and/or CdTe.

In operation, a voltage potential (shown in the figures as an "electrical signal") can be applied on the EO material body such that an electric field is formed across the EO material body. The voltage potential may be applied through a control signal by controller 222. In some embodiments, the voltage potential is applied at electrodes at the top end and the bottom end of the EO material body, as shown in FIG. 3A, and an electric field is formed between the electrodes, e.g., being perpendicular to the electrodes throughout the EO material body. In some embodiments, the top and bottom ends of the EO material body are located on different sides of input laser beam 304 along the z-axis. The electric field can cause a space charge to form in the EO material body, and a refractive index gradient can be formed along the direction of the electric field, e.g., between the electrodes. In various embodiments, depending on the orientation of EO deflector 302, the electric field may be along any suitable direction that is perpendicular to the y-axis. Depending on the voltage potential, the refractive index may gradually increase or decrease from the top end to the bottom end of the EO material body (e.g., between the electrodes). Input laser beam 304 may propagate in the EO material body, and be cumulatively refracted as it propagates through the EO material body.

To obtain a desired deflection angle $\theta_D$, parameters such as the material of the EO material body (i.e., EO crystal), the voltage potential, and the dimensions of EO material body along the z-axis and the x-axis, can be determined or optimized. In various embodiments, the parameters are determined based on equation $\theta=K1LV/d^2$ for Pockels EO crystals, and $\theta=K2LV^2/d^3$ for Kerr EO crystals. In some embodiments, the voltage potential can be varied to cause a changing or variable deflecting angle in order to dynamically compensate the beam deviation angle. The voltage potential may be provided by an electrical drive signal (not shown in the figures). In some embodiments, reflection angle $\theta_D$ may be determined based on the angle change in scanner 210 during the beam travel time to and from object 212.

In some embodiments, EO deflector 302 is coupled to a motor/actuator. In some embodiments, based on the travel direction of input laser beam 304 and/or the relative positions between beam splitter 213 and photosensor 216, the motor/actuator is configured to move EO deflector 302, e.g., along the x-axis and/or the y-axis, to timely deflect input laser beam 304 such that output laser beam 306 is incident on the predetermined area on photosensor 216. In some embodiments, the voltage potential can be kept constant to cause a constant deflection angle. Instead, the motor/actuator is configured to rotate EO deflector 302 so that input laser beam 304 can be incident on the refractive index gradient at a desired angle, and output laser beam 306 can travel towards the predetermined area on photosensor 216.

FIG. 3B illustrates another EO deflector 312 in beam deflecting unit 220. EO deflector 312 deflects a laser beam based on a diffraction grating on which the laser beam impinges. An input laser beam 314 may be received by EO deflector 312 on one side (e.g., on the incident surface). Input laser beam 314 may be deflected by EO deflector 312 and exiting from the other side (e.g., from the exiting surface), forming an output laser beam 316. A deflection angle, e.g., between input and output laser beams 314 and 316, is represented by $\theta_D$. EO deflector 312 may include a non-uniform medium formed by an EO material body. The EO material body may be made of any suitable EO crystals of which the refractive indices can be modulated by an electric field formed by a voltage potential applied on the EO material body. In various embodiments, as previously described, EO deflector 312 may include ZnSe, ZnTe, KDP, LiNbO$_3$, BaTiO$_3$, LiTaO$_3$, KTiOPO$_4$, LN, ADP, SrTiO$_3$, PLZT, KTN, and/or CdTe.

In operation, a voltage potential (shown in the figures as an "electrical signal") can be applied between the incident and exiting surfaces of the EO material body by a pair of electrodes 318 and 320, as shown in FIG. 3B, such that an electric field is formed between electrodes 318 and 320. Electrodes 318 and 320 may be coated respectively on the incident and exiting surfaces. The electric field may be perpendicular to electrodes 318 and 320 (in x-axis). The electric field may cause a diffraction grating (e.g., an optical diffraction grating) to be formed across the EO material body in the area covered by electrodes 318 and 320.

A suitable combination of patterns of electrodes 318 and 320 can be employed to generate the desired diffraction grating. At least one of electrodes 318 and 320 are patterned. The electrode pattern(s) may at least nominally match the pattern of the diffration grating. In some embodiments, the patterned electrode includes a pluralilty of strips extending along the y-axis, and a length of each strip (e.g., along the z-axis) is nominally equal to the period of the diffraction grating. In some embodiments, electrodes 318 and 320 can each be a patterned electrode. In some embodiments, electrodes 318 and 320 may have a sufficiently high light transmission rate such that little or no loss of light is caused when the laser beam is transmitted and deflected in the EO material body. In some embodiments, electrodes 318 and 320 are transparent electrodes that include conductive material(s) such as indium tin oxide (ITO).

In some embodiments, one of electrodes 318 and 320 has a patterned conductive film, and the other one has an unpatterned conductive film. The electrode with the patterned conductive film can be placed on one of the incident and exitting surfaces, and the electrode with the unpatterned conductive film can be placed on the other one of the incident and exitting surfaces. One of electrodes 318 and 320 can be connected to the electrical signal, and the other one is connected to the ground (GND). In an example, as shown in FIG. 3B, electrode 318, on the incident surface, is an unpatterned conductive film and receive the electrical signal, while electrode 320, on the exiting surface, is a patterned electrode and connected to GND. In some other embodiments, electrode 318, on the incident surface, is an unpatterned conductive film connected to GND, while electrode 320, on the exiting surface, is a patterned electrode and receive the electrical signal. When a voltage potential is applied on electrodes 318 and 320 between the incident and exiting surfaces, the refractive index of the portions of the EO material body covered by the patterned electrode 320 may be modulated to increase or decrease, resulting in a periodic change of refractive index along the z-axis. The optical diffraction grating may then be formed.

A laser beam, incident on the incident surface, may be deflected and outputted at the exiting surface. The angle of the first-order diffraction signal can be described as $$\theta_o = \arcsin\left(\sin\theta_i - \frac{\lambda}{d}\right),$$

in which $\theta_o$ represents the angle of the first-order diffraction signal, $\theta_i$ represents the incident angle, $\lambda$ represents the wavelength of the laser beam, and d represents the period of the diffraction grating (or the length of the strip of electrode 320). In this equation, $\theta_o$ and $\theta_i$ each represents the angle between the direction of the laser beam and the respective surface normal. In some embodiments, only the first-order diffraction signal is considered as the output laser beam described in this disclosure, and is collected by photosensor 216 for further processing. The deflection angle may then be equal to the angle between the directions of laser beam at the incident surface and the exiting surface, e.g., $(\theta_o+\theta_i)$. In various embodiments, incident angle $\theta_i$ may take zero and any suitable non-zero values. In some embodiments, $$\theta_o = \arcsin\left(\sin\theta_i - \frac{\lambda}{d}\right).$$

In some embodiments, EO deflector 312 is coupled to a motor/actuator. In some embodiments, based on the travel direction of input laser beam 314 and/or the relative positions between beam splitter 213 and photosensor 216, the motor/actuator is configured to move EO deflector 312, e.g., along the x-axis and/or the y-axis, to timely deflect input laser beam 314 such that output laser beam 316 is incident on the predetermine area on photosensor 216. In some embodiments, the motor/actuator is configured to rotate EO deflector 312 so that input laser beam 314 can be incident on the refractive index gradient at a desired angle. The value of $\theta_D$ can accordingly be further adjusted/optimized, and the diffraction loss can be minimized Referring back to FIG. 2A, beam deflecting unit 220 may be configured to receive first laser beam 217-1 and deflect first laser beam 217-1 towards photosensor 216, forming a second laser beam 217-2. The deflection angle of beam deflecting unit 220, i.e., the difference between directions of first laser beam 217-1 and second laser beam 217-2 may be equal to $\Delta\theta_D$, as described above. By deflecting first laser beam 217-1 by deflection angle $\Delta\theta_D$, second laser beam 217-2 may be, incident on the predetermined area on photodetector 220. For illustrative purposes, in FIG. 2A, beam deflecting unit 220 is depicted to be positioned between beam splitter 213 and photosensor 216. In various embodiments, depending on the design, beam deflecting unit 220 can be placed between a collimator lens (not shown) and photosensor 216 and/or between beam splitter 213 and the collimator lens. The actual placement of beam deflecting unit 220 should not be limited by the depiction in the figure.

Photosensor 216 may include any photo-sensitive material that can convert light (i.e., photons) into an electric current (e.g., electrical signal 218). The electric current is generated when photons are absorbed in the photodiode. By using beam deflecting unit 220, second laser beam 217-2 can be incident on photosensor 216 at a predetermined area, e.g., an area that was designed to optimize detection. Also, because beam deflecting unit 220 can precisely deflect returned laser beam 211 towards the predetermined area, a small-sized photosensor 216 may be sufficient to receive returned laser beam 211. In some embodiments, photosensor 216 includes a smaller photodetector array or a single photodetector.

FIG. 2B illustrates a non-coaxial system 201. Different from full-coaxial system 200, non-coaxial system 201 may not include a beam splitter. In some embodiments, non-coaxial system 201 includes a semi-coaxial system. As shown in FIG. 2B, laser beam 209 may be emitted, by laser source 208, towards object 212 without a beam splitter. Returned laser beam 211 may be received by scanner 210, and be deflected towards beam deflecting unit 220, forming a first laser beam 217-1. Beam deflecting unit 220 may receive first laser beam 217-1, and deflect first laser beam 217-1 towards a predetermined area on photosensor 216, forming a second laser beam 217-2. For ease of illustration, optics and devices of LiDAR system 102 between laser source 208 and object 212 are not shown.

First laser beam 217-1, formed by the deflection of returned laser beam 211 by scanner 210, may travel in a direction that deviates from a reference direction. Similar to full-coaxial system 200, the reference direction may represent a direction along which a laser beam would travel from scanner 210 to a predetermined area in photosensor 216. A difference between the direction of first laser beam 217-1 and the reference direction may be referred to as a deviation angle. For non-coaxial system 201, in some embodiments, the reference direction represents the direction along which returned laser beam 211 would be deflected by scanner 210 if the rotation angles of scanner 210 at the time of emission and at time of arrival are the same. In various embodiments, the reference direction may also represent another desired direction along which returned laser beam 211 would be deflected towards the predetermined area from scanner 210 when scanner 210 is at a rotation angle different from that at the time of emission.

As shown in FIG. 2B, a dashed arrow is depicted to represent reference laser beam 215, which travels along the reference direction. The deviation angle, represented by $\theta_{DE}$, may be the difference between directions of reference laser beam 215 and first laser beam 217-1. Assuming the time of emission of laser beam 209 is t1 and the time of arrival of returned laser beam 211 is t2, angle change $\Delta\theta$ of scanner 210 may be equal to the difference between the rotation angles of scanner 210 at t1 and t2, respectively. Based on the geometric relationship between the rotation angle of scanner 210 and the direction of first laser beam 217-1, angle change $\Delta\theta$ is proportional to the deviation angle of the same time point, which is equal to twice the angle change, i.e., $(2\times\Delta\theta)$.

Controller 222 may be functionally coupled to laser source 208, scanner 210, beam deflecting unit 220, and photosensor 216, to coordinate the operations of each part. For example, controller 222 may be configured to control the emission of laser beam 209, the rotation of scanner 210, and/or the beam deflection by beam deflecting unit 220.

Controller 222 may control the time of emission, and synchronize the change of the deflection angle of beam deflection unit with the rotation of scanner 210 such that after (e.g., from the time) laser source 208 emits a laser beam, controller 222 may apply a control signal to scanner 210 at each time point to dynamically adjust the deflection angle of beam deflecting unit 230. At each time point, the control signal enables beam deflecting unit 220 to have a deflection angle that can compensate (e.g., match) the deviation angle of the returned laser beam if it arrives at scanner 210 at the current time point. In some embodiments, the control signal is determined based on $\Delta\theta$, i.e., the difference between the rotation angle of scanner 210 at time of emission and the rotation angle of scanner 210 of the current time point. That is, the deflection angle (e.g., the control signal) is synchronized with the angle change of scanner 210 in real time in order to compensate the deviation angle at the current time point. Thus, the compensation of the deflection angle does not depend on knowledge of the actual arrival time of returned laser beam 211. The accuracy of compensation is thus not affected by the unpredictability of the arrival time.

Figure 4:
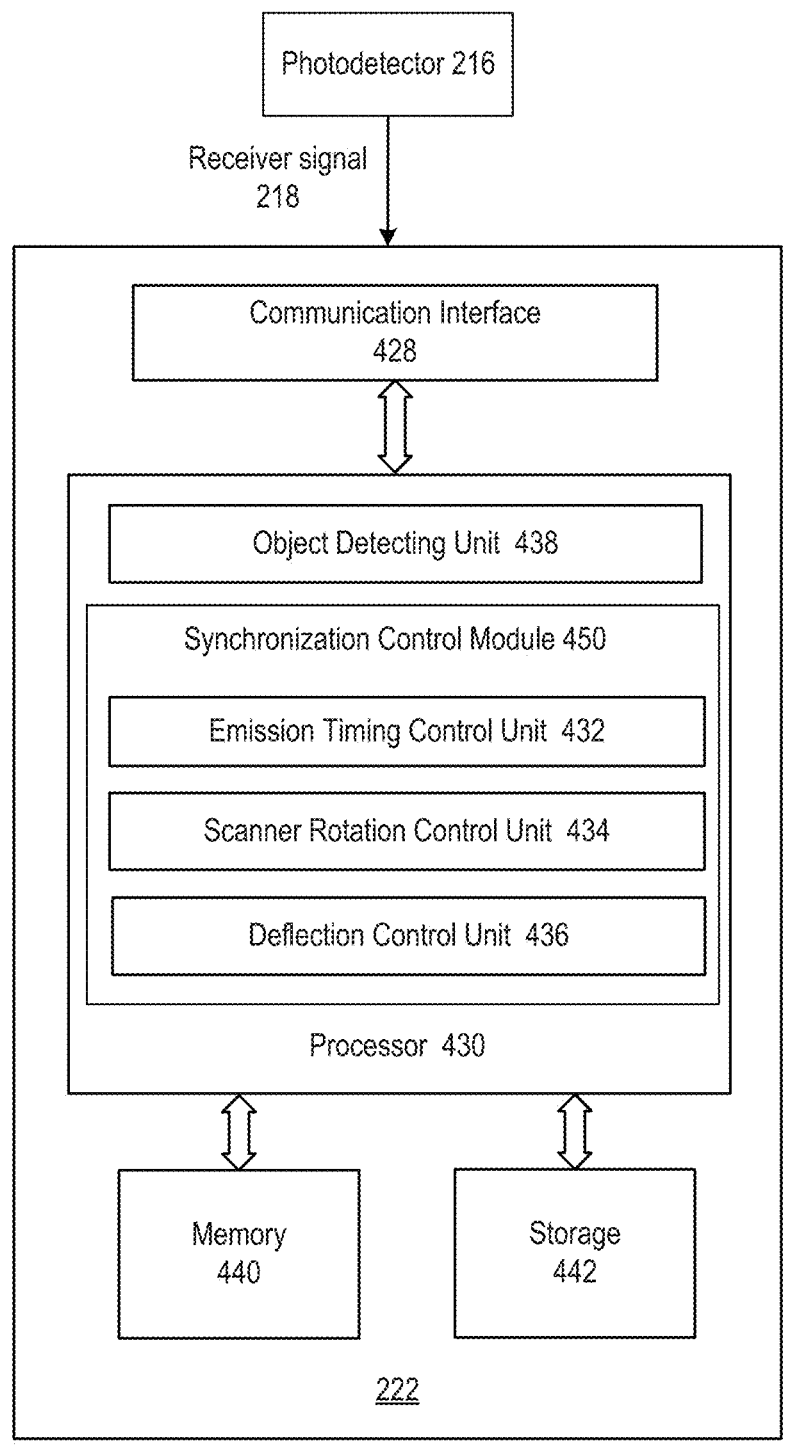
FIG. 4 illustrates an exemplary controller, according to embodiments of the disclosure.

FIG. 4 shows an exemplary implementation of controller 222, according to embodiments of the disclosure. Consistent with the present disclosure, controller 222 may receive receiver signal 218 (e.g., containing power data of returned laser beam 211) from photosensor 216.

In some embodiments, as shown in FIG. 4, controller 222 may include a communication interface 428, a processor 430, a memory 440, and a storage 442. In some embodiments, controller 222 may have different modules in a single device, such as an integrated circuit (IC) chip (implemented as, for example, an application-specific integrated circuit (ASIC) or a field-programmable gate array (FPGA)), or separate devices with dedicated functions. In some embodiments, one or more components of controller 222 may be in a single location (such as inside vehicle 100 or a mobile device) or distributed locations. Components of controller 222 may be in an integrated device, or distributed at different locations but communicate with each other through a network.

Communication interface 428 may send data to and receive data from components such as photosensor 216 via communication cables, a Wireless Local Area Network (WLAN), a Wide Area Network (WAN), wireless communication links such as radio waves, a cellular network, and/or a local or short-range wireless network (e.g., Bluetooth™), or other communication methods. In some embodiments, communication interface 428 can be an integrated services digital network (ISDN) card, cable modem, satellite modem, or a modem to provide a data communication connection. As another example, communication interface 428 can be a local area network (LAN) card to provide a data communication connection to a compatible LAN. Wireless links can also be implemented by communication interface 228. In such an implementation, communication interface 428 can send and receive electrical, electromagnetic or optical signals that carry digital data streams representing various types of information.

Consistent with some embodiments, communication interface 428 may receive receiver signal 218 (e.g., containing data of returned laser beam 211). In some embodiments, communication interface 428 may sequentially receive receiver signals 218 as scanner 210 continues to scan laser beams 209 at the scanning rate. Communication interface 428 may transmit the received receiver signal 218 to processor 430 for processing.

Processor 430 may include any appropriate type of general-purpose or special-purpose microprocessor, digital signal processor, or microcontroller. Processor 430 may be configured as a stand-alone processor module dedicated to analyzing signals (e.g., receiver signal 218) and/or controlling the scan schemes. Alternatively, processor 430 may be configured as a shared processor module for performing other functions unrelated to signal analysis/scan scheme control.

As shown in FIG. 4, processor 430 may include multiple functional units or modules that can be implemented using software, hardware, middleware, firmware, or any combination thereof. For example, processor 430 may include an object detecting unit 438 and a synchronization control module 450, and the like. In some embodiments, synchronization control module 450 includes an emission timing control unit 432, a scanner rotation control unit 434, and a deflection control unit 436.

Synchronization control module 450 may control the synchronization of laser source 208, scanner 210, and beam deflecting unit 220 such that the deviation angle of the returned laser beam at any time point can be dynamically compensated with the deflection angle of beam deflecting unit 220 at the same (i.e., current) time point. In some embodiments, the time period from the time of emission by laser source 208 to the time of detection by photosensor 216 may be set as a cycle. In various embodiments, laser beam 209 may include one or more laser pulses along the scanning direction. For ease of description, laser beam 209 is described to include a single laser pulse. It is noted that, the compensation of deviation angles for laser beam 209 with more than one laser pulse can be the same and is not described in detail. Synchronization control module 450 may control the operations of units 432-436 such that from the beginning of each cycle, the operations of units 432-436 are synchronized. The detailed description of synchronization control is described as follows.

Synchronization control module 450 may also determine a plurality of time points (e.g., t1, t2, t3, . . . , tn, n being a positive integer), each of which is separated from the previous time point by a time interval $\Delta t$. In various embodiments, $\Delta t$ may be a constant value or a varying value, depending on the operations of LiDAR system 102. For example, $\Delta t$ may be a constant value. In some embodiments, the selection of $\Delta t$ also depends on the speed beam deflecting unit 220 responds to the control signal. For example, if beam deflecting unit 220 can respond sufficiently fast to the control signal, synchronization control module 450 may determine $\Delta t$ to be a desirably small value to increase the compensation accuracy. In various embodiments, the value of $\Delta t$ can range from a few microseconds to tens of milliseconds. In some embodiments, a predetermined look-up table reflecting the relationship between the rotation angles (or rotation speed) of scanner 210 and time is used, by scanner rotation control unit 434, to control the rotation of scanner 210. In some embodiments, the rotation angle of scanner 210 is measured in real time by scanner rotation control unit 434. The data reflecting the rotation angle of scanner 210 at the time of emission, predetermined or measured, may be obtain by synchronization control module 450.

At the beginning of each cycle, emission timing control unit 432 may control laser source 208 to emit a laser pulse. At the same time, scanner rotation control unit 434may determine the rotation angle of scanner 210 at the time of emission. In various embodiments, scanner rotation control unit 434 may determine the rotation angle of scanner 210 by measurement or from predetermined look-up table(s). The data reflecting the rotation angle of scanner 210 at the time of emission, predetermined or measured, may be obtain by synchronization control module 450.

At the first time point, which is Δt after the time of emission, synchronization control module 450 may obtain the rotation angle of scanner 210 based on the look-up table or real-time measurement. At the same time (e.g., the first time point), synchronization control module 450 may determine the angle change Δθ of scanner 210 at the first time point. In some embodiments, Δθ is determined to be the difference between the rotation angles of scanner 210 at the current time point (i.e., the first time point) and the time of emission. At the same time, deflection control unit 436 may generate a control signal based on the value of Δθ, and deflection control unit 436 may apply the control signal on beam deflecting unit 220. Still at the same time, the control signal may cause the refractive index of beam deflecting unit 220 to vary, as described earlier, and form a deflection angle that is equal to (2×Δθ), which is equal to the deviation angle of the current time point. In some embodiments, the control signal is an electrical signal of which the value is proportional to Δθ.

A plurality of time points may elapse in a cycle, e.g., before returned laser beam 211 actually arrives at scanner 210. For each of the time points following the first time point, synchronization control module 450 may repeat the operations described above to determine the angle change Δθ of each respective time point in real time, and cause the deflection angle (2×Δθ) in real time. In some embodiments, synchronization control module 450 may continue to adjust the deflection angle of beam deflecting unit 220 for each time point until the cycle is completed. When returned laser beam 211 is deflected by scanner 210 at any time point, first laser beam 217-1 may be deflected by the current deflection angle (i.e., the deflection angle for the current time point), and second laser beam 217-2 may be deflected towards the predetermined area on photosensor 216.

When second laser beam 217-2 is received by photosensor 216, object detecting unit 438 may determine the distance between object 212 and LiDAR 102, and send an alert signal to synchronization control module 450. Synchronization control module 450 may determine the current cycle is completed and start the cycle for the next laser pulse. Object detecting unit 438 may determine object 212 is in the FOV of LiDAR system 102 based on receiver signal 218. Object detecting unit 238 may determine the distance between object 212 and LiDAR system 102 based on, e.g., the round-trip travel time of laser beams 209 and 211 and the scanning angle of scanner 210.

Units 432-438 (and any corresponding sub-modules or sub-units) and module 450 can be hardware units (e.g., portions of an integrated circuit) of processor 430 designed for operation independently or with other components or software units implemented by processor 430 through executing at least part of a computer program. The computer program may be stored on a computer-readable medium. When the program is executed by processor 430, the executed program may cause processor 430 to perform one or more functions or operations. Although FIG. 4 shows units 432-438 all within one processor 430, it is contemplated that these units may be distributed among multiple processors located close to or remotely with each other.

Memory 440 and storage 442 may include any appropriate type of mass storage provided to store any type of information that processor 430 may need to operate. Memory 440 and/or storage 442 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, a static RAM, a hard disk, an SSD, an optical disk, etc. Memory 440 and/or storage 442 may be configured to store one or more computer programs that may be executed by processor 430 to perform functions disclosed herein. For example, memory 440 and/or storage 442 may be configured to store program(s) that may be executed by processor 430 to analyze LiDAR signals and control the scanning schemes of laser beams.

Memory 440 and/or storage 442 may be further configured to store/cache information and data received and/or used by processor 430. For instance, memory 440 and/or storage 442 may be configured to store/cache receiver signal 218, look-up tables storing mapping relationship between rotation angles and time points, and calculation results obtained by different units of processor 430. The various types of data may be stored permanently, removed periodically, or disregarded immediately after each frame of data is processed.

Figure 5:
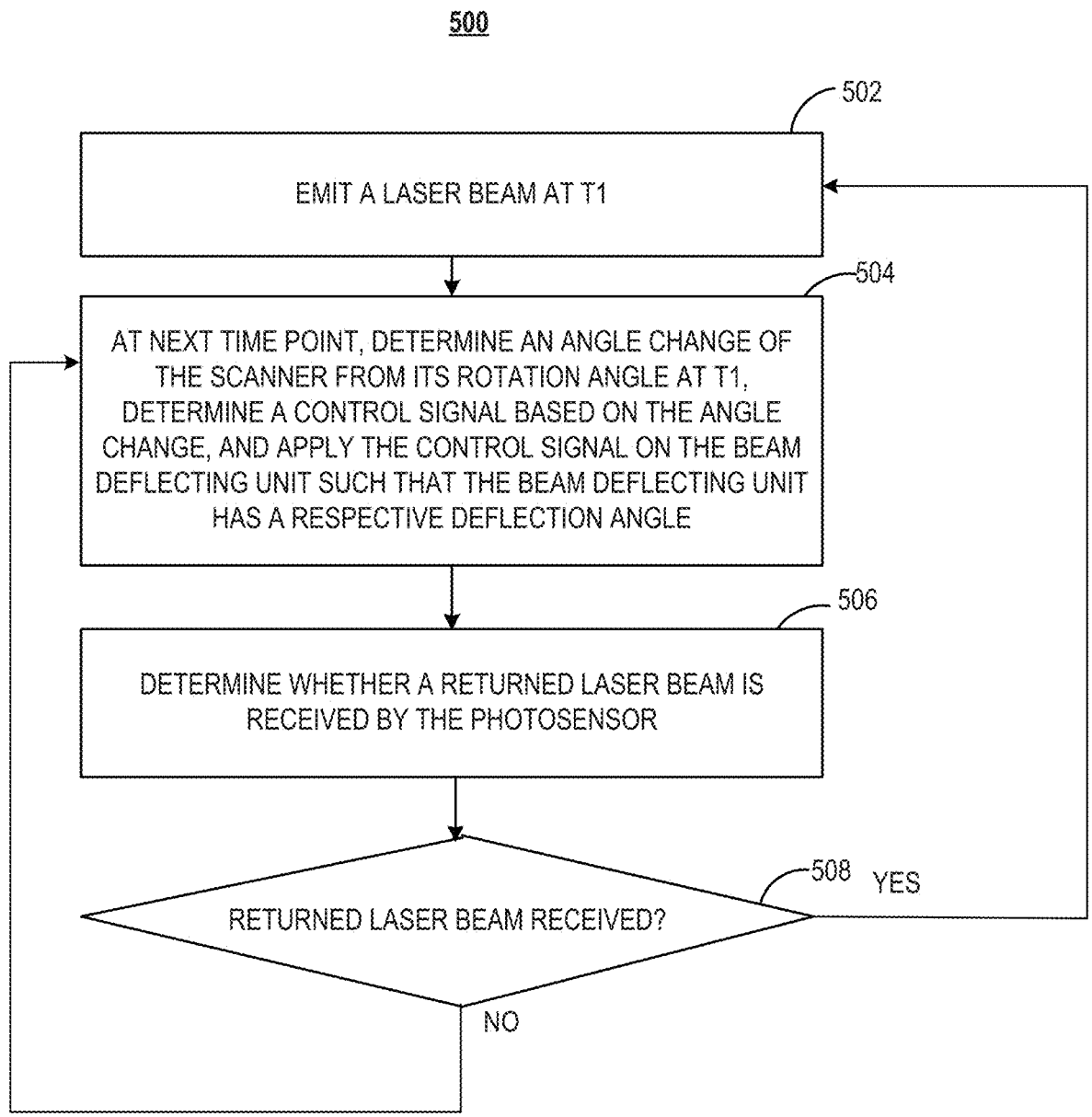
FIG. 5 illustrates a flowchart of an exemplary method to compensate beam deviation using a beam deflecting unit, according to embodiments of the disclosure.

FIG. 5 illustrates a flow chart of an exemplary method 500 for dynamically compensating the deviation angle of returned laser beam 211, according to some embodiments. For ease of illustration, method 500 is described with FIGS. 2A and 2B, and the compensation of deviation angle $\theta_{DE}$ is used as an example to describe method 500. As an example, the laser beam includes one laser pulse.

At step 502, a laser beam is emitted at time t1. Referring to FIGS. 2A and 2B, controller 222 may control laser source 208 to emit a laser beam 209 at time t1. Controller 222 may determine t1 as the time of emission. In some embodiments, controller 222 records t1 as the start of a cycle. In some embodiments, in full-coaxial system 200, controller 222 determines the rotation angle of scanner 210 at t1 as the rotation angle when laser beam 209 arrives at scanner 210.

At step 504, at the next time point, an angle change of the scanner from its rotation angle at t1 is determined; a control signal based on the angle change is determined; and the control signal is applied on the beam deflecting unit such that the beam deflecting unit has a respective deflection angle. At the next time point after t1 (e.g., the first time point), controller 222 may determine an angle change Δθ of scanner 210 based on the rotation angle of scanner 210 at the current (e.g., respective) time point and the rotation angle of scanner 210 at t1. Controller 222 may determine Δθ to be the difference between the rotation angles at the current time point and t1. Meanwhile, controller 222 may determine a control signal based on Δθ and apply the control signal on beam deflecting unit 220 to cause beam deflecting unit 220 to form a deflection angle equal to (2×Δθ) at the current time point. At any time point ti (i=1, 2, 3, . . . n), when returned laser beam 211 is deflected by scanner 210 towards beam deflecting unit 220, first laser beam 217-1 is formed. First laser beam 217-2 can be then deflected by a deflection angle corresponding to (e.g., for compensating) the deviation angle of beam deflecting unit 220 at the current time point to form second laser beam 217-2. Second laser beam 217-2 may travel to the predetermined area on photosensor 216.

At step 506, it is determined whether the returned laser beam is received by the photosensor. Controller 222 may determine whether returned laser beam 211 is received by photosensor 216 based on receiver signal 218.

At step 508, if the returned laser beam is received, method 500 returns to step 502, in which controller 222 starts a new cycle for another laser beam/pulse. If controller 222 determines returned laser beam 211 is received on photosensor 216, controller 222 may determine the cycle is complete and control laser source 208 to emit another laser beam/pulse. Controller 222 may record the time of emission of the other laser beam as the start of the following cycle.

At step 508, if the returned laser beam is not received, method 500 returns to step 504, in which controller 222 performs compensation for the next time point. If controller 222 determines returned laser beam 211 is not received on photosensor 216, controller 222 may continue to determine the angle change and control signal, and adjust the deflection angle for the next time point (e.g., second time point). In some embodiments, controller 222 may repeatedly perform steps 504-508 until returned laser beam 211 is determined to be received by photosensor 216.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A light detection and ranging (LiDAR) system, comprising:
   a laser source configured to emit a laser beam towards an object;
   a scanner configured to:
      receive a returned laser beam from the object, and
      deflect the returned laser beam towards a beam deflecting unit to form a first laser beam traveling along a first direction, wherein the first direction deviates from a reference direction by a deviation angle; and
   the beam deflecting unit configured to:
      receive the first laser beam, and
      deflect the first laser beam to form a second laser beam towards a photosensor; and
   a controller configured to dynamically control a deflection angle of the beam deflecting unit based on an angle change of the scanner to cause the second laser beam to be deflected towards the photosensor to compensate the deviation angle.

2. The LiDAR system of claim 1, wherein the reference direction is a direction of a reference laser beam deflected from the scanner to a predetermined area on the photosensor at a rotation angle at a time that the laser beam is emitted by the laser source.

3. The LiDAR system of claim 1, wherein the controller is further configured to:
   determine a control signal based on the angle change of the scanner; and
   apply the control signal on the beam deflecting unit to control the deflection angle.

4. The LiDAR system of claim 3, wherein
   the control signal varies as a function of the angle change; and
   the deflection angle of the beam deflecting unit varies as a function of the control signal.

5. The LiDAR system of claim 4, wherein the angle change for each time point is determined based on a predetermined relationship between the angle change and a time difference.

6. The LiDAR system of claim 4, wherein the angle change for each time point is determined based on the rotation angles measured in real time at the time that the laser beam is emitted and at the time point, respectively.

7. The LiDAR system of claim 3, wherein the controller is configured to:
   determine the angle change of the scanner for each time point as a difference between the rotation angle of the scanner at a time the laser beam is emitted by the laser source and a rotation angle at the time point; and
   determine the deflection angle for a current time point to be equal to twice the angle change.

8. The LiDAR system of claim 7, wherein the control signal at each time point is proportional to the angle change at the same time point.

9. The LiDAR system of claim 1, wherein the LiDAR includes one of a full-coaxial LiDAR and a non-coaxial LiDAR.

10. The LiDAR system of claim 1, wherein the beam deflecting unit is an electro-optical (EO) beam deflecting unit, and the controller is configured to control the deflecting angle of the beam deflecting unit by adjusting an electrical signal applied to the beam deflecting unit.

11. The LiDAR system of claim 10, wherein the beam deflecting unit is configured to:
   generate, under the control signal, a non-uniform medium having at least one of a refractive index gradient or a diffraction grating;
   receive the first laser beam such that the first laser beam impinges upon the non-uniform medium; and
   deflect the first laser beam to form the second laser beam towards the photosensor, wherein the first and the second laser beams form the deflection angle.

12. The LiDAR system of claim 11, wherein the non-uniform medium comprises an EO material body comprising at least one of ZnSe, ZnTe, potassium dihydrogen phosphate (KDP), $LiNbO_3$, $LiTaO_3$, $BaTiO_3$, $KTiOPO_4$, ammonium dihydrogen phosphate (ADP), $SrTiO_3$, lead zirconate titanate (PLZT), potassium tantalum niobate (KTN), lithium niobate (LN), cadmium telluride (CdTe).

13. A method for compensating beam deviation in a light detection and ranging (LiDAR) system, the method comprising:
   receiving, by a scanner, a returned laser beam from an object;
   deflecting, by the scanner, the returned laser beam towards a beam deflecting unit to form a first laser beam traveling along a first direction, wherein the first direction deviates from a reference direction by a deviation angle;
   deflecting, by the beam deflecting unit, the first laser beam to form a second laser beam towards a photosensor; and
   dynamically controlling, by a controller, a deflection angle of the beam deflecting unit based on an angle change of the scanner to cause the second laser beam to be deflected towards the photosensor to compensate the deviation angle.

14. The method of claim 13, further comprising determining the reference direction to be a direction of a reference laser beam deflected from the scanner to a predetermined area on the photosensor at a rotation angle at a time that the laser beam is emitted by the LiDAR system.

15. The method of claim 13, further comprising:
   determining a control signal based on the angle change of the scanner; and
   applying the control signal on the beam deflecting unit to control the deflection angle.

16. The method of claim 15, wherein determining the control signal comprises determining, at each time point, the control signal to be proportional to the angle change at the same time point.

17. The method of claim 15, further comprising:
determining the angle change of the scanner for each time point as a difference between the rotation angle of the scanner at a time the laser beam is emitted by the laser source and a rotation angle at the time point; and
determining the deflection angle for a current time point to be equal to twice the angle change.

18. The method of claim 17, wherein determining the angle change comprises at least one of:
determining the angle change for each time point based on a predetermined relationship between the angle change and a time difference; or
determining the angle change for each time point based on the rotation angles measured in real time at the time that the laser beam is emitted and at the time point, respectively.

19. A system for compensating beam deviation in light detection and ranging (LiDAR), comprising:
a beam deflecting unit configured to:
receive a first laser beam traveling along a first direction, wherein the first laser beam is formed by a scanner by deflecting a laser beam emitted by a laser source towards an object and then returned from the object, wherein the first direction deviates from a reference direction by a deviation angle, and
deflect the first laser beam to form a second laser beam towards a photosensor; and
a controller configured to dynamically control a deflection angle of the beam deflecting unit based on an angle change of the scanner to cause the second laser beam to be deflected towards the photosensor to compensate the deviation angle.

20. The system of claim 19, wherein the controller is further configured to:
determine a control signal based on the angle change of the scanner; and
apply the control signal on the beam deflecting unit to control the deflection angle.

* * * * *